(12) United States Patent
Waldspurger et al.

(10) Patent No.: US 7,945,908 B1
(45) Date of Patent: May 17, 2011

(54) METHOD AND SYSTEM FOR IMPROVING THE ACCURACY OF TIMING AND PROCESS ACCOUNTING WITHIN VIRTUAL MACHINES

(75) Inventors: Carl Waldspurger, Palo Alto, CA (US); Michael Craig, Berkeley, CA (US); Ramesh Dharan, San Francisco, CA (US); Rajit S. Kambo, Sunnyvale, CA (US); Timothy P. Mann, Palo Alto, CA (US); Stephen A. Muckle, San Diego, CA (US); Boris Weissman, Mountain View, CA (US); John Zedlewski, Cambridge, MA (US)

(73) Assignee: VMware, Inc., Palo Alto, CA (US)

( * ) Notice: Subject to any disclaimer, the term of this patent is extended or adjusted under 35 U.S.C. 154(b) by 1379 days.

(21) Appl. No.: 11/394,927

(22) Filed: Mar. 31, 2006

(51) Int. Cl.
*G06F 9/455* (2006.01)
*G06F 13/24* (2006.01)

(52) U.S. Cl. .............................. 718/1; 710/260; 710/263

(58) Field of Classification Search ...... 718/1; 710/260, 710/263
See application file for complete search history.

(56) References Cited

U.S. PATENT DOCUMENTS

| | | | |
|---|---|---|---|
| 2003/0037089 A1* | 2/2003 | Cota-Robles et al. | 709/1 |
| 2005/0004879 A1* | 1/2005 | Mathias et al. | 705/400 |
| 2005/0228921 A1* | 10/2005 | Sethi et al. | 710/268 |
| 2006/0146057 A1* | 7/2006 | Blythe | 345/506 |
| 2006/0230317 A1* | 10/2006 | Anderson | 714/38 |
| 2007/0033589 A1* | 2/2007 | Nicholas et al. | 718/1 |
| 2007/0067435 A1* | 3/2007 | Landis et al. | 709/224 |

OTHER PUBLICATIONS

Andrew Whitaker; Marianne Shaw; Steven D. Gribble; "Scale and performance in the Denali isolation kernel"; ACM SIGOPS Operating Systems Review; vol. 36 , Issue SI (Winter 2002); OSDI '02: Proceedings of the 5th symposium on Operating systems design and implementation; pp. 195-209; Year of Publication: 2002.*

* cited by examiner

*Primary Examiner* — Emerson C Puente
*Assistant Examiner* — Nikhil Krishnan

(57) ABSTRACT

A sponge process, for example within a driver in a guest operating system, is associated in a virtual computer system with each virtual processor in one or more virtual machines. When timer interrupts become backlogged, for example because a virtual machine is temporarily descheduled to allow other virtual machines to run, and upon occurrence of a trigger event, a conventional interrupt is disengaged and catch-up interrupts are instead directed into an appropriate one of the sponge processes. The backlogged timer interrupts are thus delivered without unfairly attributing descheduled time to whatever processes happened to be running while the catch-up interrupts are delivered, and without violating typical guest operating system timing assumptions.

40 Claims, 3 Drawing Sheets

METHOD AND SYSTEM FOR IMPROVING THE ACCURACY OF TIMING AND PROCESS ACCOUNTING WITHIN VIRTUAL MACHINES

BACKGROUND OF THE INVENTION

1. Field of the Invention

This invention relates generally to computer virtualization and, in particular, to a method and system for improving the accuracy of timing and process accounting within virtual machines.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Virtualized Computer Systems

Figure 1:
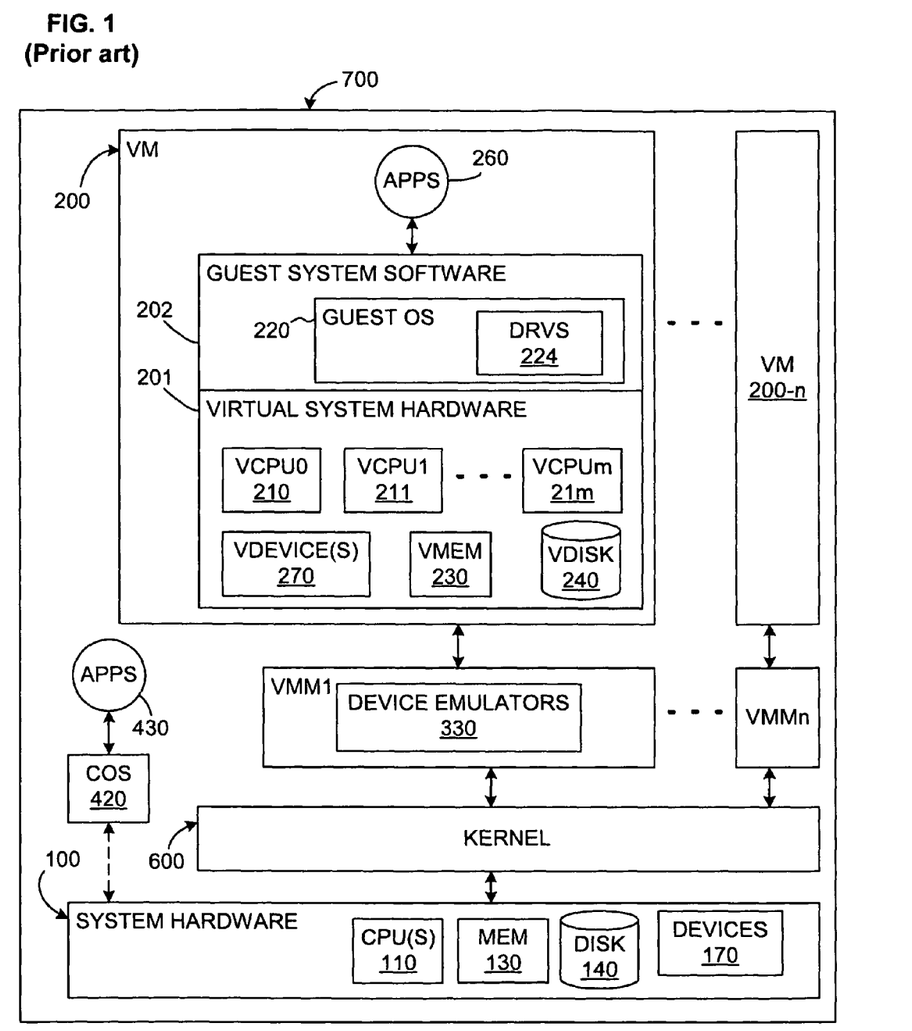
FIG. 1 is a block diagram of one example of a hosted virtualization system, which, in general, is known in the prior art.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM) or "guest" 200 is installed on a "host platform," or simply "host," which will include a system hardware, that is, a hardware platform 100, and one or more layers or co-resident components comprising system-level software, such as an operating system or similar kernel, or a virtual machine monitor or hypervisor (see below), or some combination of these.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

Note that a single VM may be configured with more than one virtualized processor. To permit computer systems to scale to larger numbers of concurrent threads, systems with multiple CPUs have been developed. These symmetric multi-processor (SMP) systems are available as extensions of the PC platform and from other vendors. Essentially, an SMP system is a hardware platform that connects multiple processors to a shared main memory and shared I/O devices. Virtual machines may also be configured as SMP VMs. FIG. 1, for example, illustrates multiple virtual processors 210-0, 210-1, . . . , 210-m (VCPU0, VCPU1, . . . , VCPUm) (collectively, 210) within the VM 200.

Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, such as some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB). This invention may be used regardless of the type—physical and/or logical—or number of processors included in a VM.

If the VM 200 is properly designed, applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is generally required between the guest software within a VM and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in the host OS itself. Unless otherwise indicated, the invention described below may be used in virtualized computer systems having any type or configuration of virtualization software.

Moreover, FIG. 1 shows virtual machine monitors that appear as separate entities from other components of the virtualization software. Furthermore, some software components used to implemented one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. The illustrated embodiments are given only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software, and even in systems that provide specific hardware support for virtualization.

The various virtualized hardware components in the VM, such as the virtual CPU(s), the virtual memory 230, the virtual disk 240, and the virtual device(s) 270, are shown as being part of the VM 200 for the sake of conceptual simplicity. In actuality, these "components" are usually implemented as software emulations included in the VMM. One advantage of such an arrangement is that the VMM may (but need not) be set up to expose "generic" devices, which facilitate VM migration and hardware platform-independence.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

As illustrated in FIG. 1, in many cases, it may be beneficial to deploy VMMs on top of a software layer—a kernel 600—constructed specifically to provide efficient support for the VMs. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMs/VMMs. The kernel 600 also handles any other applications running on it that can be separately scheduled, as well as a console operating system that, in some architectures, is used to boot the system and facilitate certain user interactions with the virtualization software.

Note that the kernel 600 is not the same as the kernel that will be within the guest OS 220—as is well known, every operating system has its own kernel. Note also that the kernel 600 is part of the "host" platform of the VM/VMM as defined above even though the configuration shown in FIG. 1 is commonly termed "non-hosted;" moreover, the kernel may be both part of the host and part of the virtualization software or "hypervisor." The difference in terminology is one of perspective and definitions that are still evolvng in the art of virtualization.

Problems of Timer Virtualization

Common, commercially available off-the-shelf operating systems, that is, "commodity" OSs, including Linux and Windows, generally depend on periodic timer interrupts for two important activities. First, the OS advances its notion of real time in response to each timer interrupt; elapsed real time since the OS was booted is often maintained as a simple count of timer "ticks, where each tick corresponds to the amount of time between two timer interrupts.

Second, the OS performs statistical process accounting by charging the process (a schedulable entity within the guest OS; the exact terminology—process, thread, or task—depends on the particular guest OS) that was running while the timer interrupt occurred for consuming a timer tick's worth of CPU time: When a timer interrupt occurs, the OS determines which process was running at the moment the interrupt arrived, and it attributes one tick worth of CPU time to that process; this may also be termed "delivering" the interrupt "to" or "into" or "in the context of" the process. Of course, that process may not have been running for a whole tick, but because timer interrupts are approximately randomly distributed relative to when processes start and stop, the results are statistically valid—the amount of time attributed to a given process over the long term is approximately correct. Note that this also applies to a process executing an idle loop, and to the timer sponge process according to the invention (see below) as well.

In a virtualized environment, where such a commodity OS is run within a VM as the guest OS, both of these activities may be adversely affected by the virtualization of timer interrupts. When many VMs are running on a single physical machine, managed by the host OS or on some component of the virtualization software, hardware CPU resources are time-multiplexed, with the result that a given VM may be descheduled for relatively long periods of time. When the VM is run after being descheduled, however, it may have accumulated a backlog of timer interrupts corresponding to the elapsed real time during which it was descheduled. For example, with a timer period of 10 milliseconds, if the VM is descheduled for 50 milliseconds, it will be "behind" by 5 timer interrupts when it resumes execution.

Descheduling a VM to run other VMs is probably the most common scenario in which a VM may "fall behind" and accumulate a backlog of timer interrupts, but other aspects of virtualized environments may also result in the same problem. For example, virtualization overhead or delays due to blocking I/O may sometimes be large enough to cause a VM to fall behind due to "self-induced" overhead, even if it is never forcibly descheduled due to contention for CPU time.

One way to "handle" backlogged timer interrupts is simply to have a policy of not handling them at all, but rather simply to drop them and accept that, with respect to VMs, the guest OS's notion of time may lag real time. Some existing virtualization systems, however, implement a backlogged interrupt policy to help a guest that is behind "catch up" to real time by delivering its backlog of timer interrupts at some faster rate. However, this will often distort the guest's statistical process accounting, unfairly attributing descheduled time to whatever processes happened to be running while the catch-up interrupts are delivered. This distortion is especially problematic for workload management software (such as popular commercial offerings from BMC, IBM, and Computer Associates) running in the guest OS, which depends on accurate per-process CPU accounting.

An additional problem with catch-up approaches is ensuring that virtual timer interrupts aren't delivered to the guest OS so quickly that the next timer interrupt is raised while an earlier one is still pending, that is, still being processed, which would not occur in a "normal" system, that is, one in which the OS is receiving timer interrupts directly from hardware. Similarly, delivering catch-up timer interrupts also runs the risk of triggering guest OS bugs by violating timing assumptions that are reasonable on physical machines, for example, causing interrupts to nest by delivering the next timer interrupt while the guest OS is still handling an earlier one.

There is therefore a need for a mechanism that accurately represents guest and host CPU utilization as observed from within the guest; this information can be used, for example, by industry standard performance monitoring and process accounting tools. There is also a need to improve guest timekeeping with respect to real time in a manner that preserves guest stability by respecting guest OS limitations related to acceptable timer interrupt spacing. This invention provides a mechanism that meets these needs.

SUMMARY OF THE INVENTION

The invention provides an improvement in a computer system that has host hardware, at least one guest supervisory software entity (for example, a guest OS in a virtual machine), and a software platform (for example, virtualization software such as a "hypervisor," VMM, kernel, etc, depending on how these terms are defined) that runs on the host hardware. In a host reference frame, the host hardware generates primary signals (for example, physical timer ticks) indicating completion of an actual resource quantum (for example, CPU time). In a guest reference frame, the guest supervisory software entity senses receipt of secondary signals indicating completion of assumed resource quanta, which the guest supervisory software entity associates with a plurality of guest supervised software entities. Receipt of secondary signals and association of the corresponding assumed resource quanta may be unsynchronized with the generation of the corresponding actual quanta such that a resource quantum backlog is created. This backlog is handled according to a first policy, examples of which include delivering the backlogged quanta at an accelerated, catch-up rate (which may, for example lag or lead the generation of the primary signals by the hardware platform), simply ignoring the interrupts altogether, etc.

According to the invention, at least one guest supervised software entity is designated as a sponge process; upon sensing, by the software platform (for example, by a control module included for the purpose), the occurrence of a triggering event, the first policy is overridden, and quantum control responses are communicated to the guest supervisory software entity, said quantum control responses including the secondary signal for at least one of any backlogged resource quanta. At least one of the secondary signals corresponding to a backlogged resource quantum is then associated with at least a respective one of the sponge processes. Secondary signals corresponding to backlogged resource quanta are thereby delivered to the supervisory software entity such that violation of any predetermined assumptions of the supervisory guest software entity regarding timing of the receipt of signals indicating a resource quantum is avoided.

In one embodiment of the invention, each guest supervisory software entity is a guest operating system (OS) running in a respective virtual machine. A sponge process is then associated with each of at least one virtualized resource. In this case, at least one virtualized resource may be a virtual processor. In situations in which the virtual processors execute idle loops when not performing any other task, for each virtual processor, the idle loop itself may be the sponge process associated with the idling virtual processor.

According to one aspect of the invention, a driver is installed in each guest OS. and, for each virtual processor in the respective virtual machine, the respective sponge process is included as part of the driver in that virtual machine.

One way to communicate the quantum control responses to each guest OS includes from the driver, issuing a request via a communications channel; and by the control module, sensing the request and returning a corresponding quantum control response from to the driver indicating whether any timer interrupts are currently backlogged. Different communications channels may be used, such as a virtual I/O port, a memory region that is accessible by both the driver and the control module, etc. Communication of quantum control responses to the guest supervisory software may include writing the responses to a respective memory region readable by the virtual machine.

In response to a further request issued by the sponge process in the driver associated with the virtual processor that is currently running, a next scheduled backlogged timer interrupt may be delivered to that sponge process. In this case, in response to further requests issued by the sponge process, additional backlogged timer interrupts may continue to be delivered to the currently running and requesting sponge process as long as there are backlogged timer interrupts.

In situations where the guest OS is configured to deschedule processes as a function of at least their consumption of processor time and of a priority of each process, it may be advantageous to assign a high priority to each sponge process—this reduces the likelihood of descheduling the sponge process even if relatively many timer interrupts are delivered to it in a relatively short interval.

Each sponge process may be maintained in an inactive state but be activated when it is time for it to receive a timer interrupt. The sponge process may then be returned to the inactive state after any timer interrupts delivered while it was executing have been fully processed. A second, currently inactive sponge process may, moreover, be activated by a first, currently active sponge process when the first sponge process senses that at least one additional backlogged timer interrupt is available. The additional backlogged timer interrupt can then be delivered to the second sponge process.

Different events may be used as triggering events. Examples include the presence of a request written by the guest operating system in a register in the virtual machine, or a hypercall from the guest OS to the software platform. The triggering event could also be an explicit signal to the guest OS independent of any request by the guest OS itself.

Moreover, a virtual timer sponge device may be exposed to the virtual machine. The sponge process may then be activated for a designated, currently inactive virtual processor by generating a virtual interrupt by the virtual timer sponge device on the currently inactive virtual process. In this case, the triggering event could be the generation of the virtual interrupt.

A plurality of sponge processes may also be associated with the same one of the virtual processors, with each of the plurality of sponge processes being charged assumed resource quanta only when the corresponding virtual machine is not active because of a respective condition.

DETAILED DESCRIPTION

In a virtualized computer environment, an embodiment of the invention provides a timer "sponge" mechanism or "process" (as mentioned above, a schedulable entity within the guest OS; the exact terminology—process, thread, or task—depends on the particular guest OS) that represents the time that a virtual machine (VM) is descheduled in such a way as to avoid incorrect attribution of time to the descheduled VM. In the preferred embodiment of the invention, a separate sponge process 812-0, . . . , 812-m is pinned, that is, bound, to a respective virtual CPU 210-0, . . . , 210-m using, for example, any known guest OS processor affinity API (application program interface).

The invention is described here primarily in terms of improving guest timekeeping. The invention may be used for other purposes as well, even those not related to any form of scheduling or allocation or charging of resource quanta to any set of schedulable entities. One example of an alternative is that the timer sponge mechanism according to the invention could also be used to more accurately profile the performance of VMs. Furthermore, an interrupt backlog may arise not only because of a delivery "lag," but also because of future behavior: virtualization software may be included, for example, that delivers timer interrupts to the sponge process in advance if the virtualization software knows in advance that a particular VM is about to be descheduled and about to accumulate a backlog.

"Scheduling" need not be restricted to any notion of CPU time, but rather implies only that there is some resource that has an associated scheduler. For example, network schedulers arbitrate access to network bandwidth, etc., and some even refer to memory as being "scheduled" by memory management code.

As will become apparent from the description below, all that is assumed when it comes to application of the invention is that there is at least one guest software entity (such as a guest OS) that tracks and charges, in the entity's reference frame, some quantum (such as, but not necessarily, a timer tick) of some resource (such as CPU time) to different processes (or other schedulable entities) for some purpose (such as scheduling execution), but in which the quantum as measured by the guest software entity may be unsynchronized with (for example, may lag behind) the quantum as measured in the reference frame of the hardware platform on which the guest software entity and the processes actually run. Thus, the invention may find use regardless of whether the guest software entity is actually termed a "virtual machine." Moreover, in those cases in which the resource quantum in fact does represent some indication of time, the invention may be used regardless of the source of the indicator; thus, it is not necessary that the source of the timer "ticks" be related to CPU time, but could come from, as just a few examples, a PIT (Programmable Interval Timer) timer, an APIC (Advanced Programmable Interrupt Controller) timer, RTC (Real-Time Clock) timer, performance counter, etc., or emulations of these devices. Furthermore, timer interrupts may also define quanta for other time-multiplexed resources.

Figure 2:
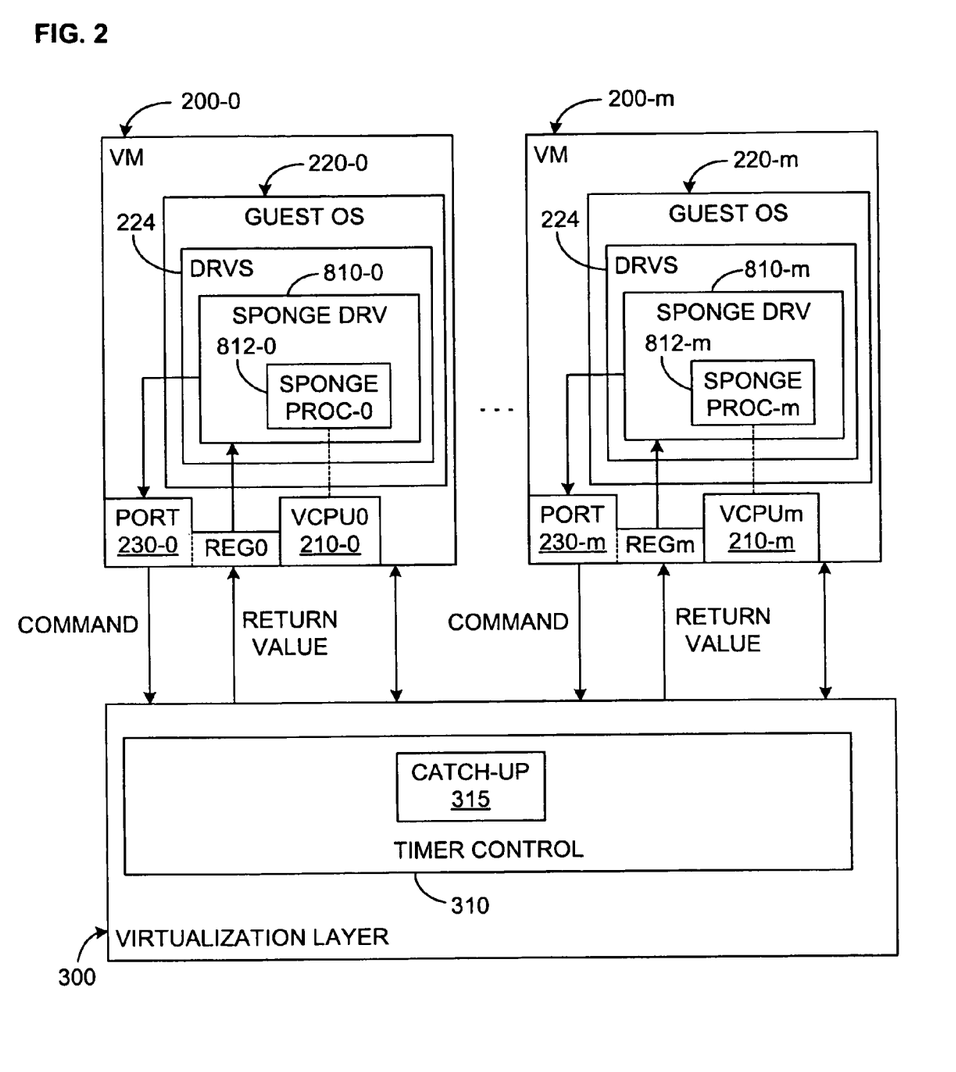
FIG. 2 is a block diagram particularly illustrating the components of the timer sponge mechanism according to the invention.

See FIG. 2. Although different methods for implementing the timer sponge are mentioned below, in the preferred embodiment of the invention, the timer sponge is split between a sponge driver 810-0, . . . , 810-m and a timer control module 310 in the virtualization layer (VMM, hypervisor, etc.).

There needs to be some mechanism for communication between the guest and the timer control module 310. In the embodiment of the invention illustrated in FIGS. 2 and 3, the driver within each guest OS communicates with the virtualization layer 300 by filling in a register REG0, . . . , REGm with a timer sponge command and then addressing and reading a respective, designated I/O port 230-0, . . . , 230-m. As in other systems, every read of an I/O port in a virtualized system will return some value in a designated register. The virtualization layer 300, which is able to observe the registers and present data on the I/O ports, intercepts activity on the I/O port, performs any action necessary to service the request made by the driver, and as appropriate returns a response (which may, for example, be a simple return value, or be null) to the driver via the I/O port; examples of actions and values implemented in one version of the invention are described below.

In FIG. 2, a single virtual CPU 210-0, and a single sponge process 812-0 (associated with the virtual CPU 210-0) within the sponge driver 810-0, are shown in the VM 200-0. This is for the sake of simplicity of description and visualization only.

As mentioned above, the system will implement some existing policy for dealing with backlogged interrupts. This policy may simply be "null," that is, no policy at all, which means that accumulated interrupts are simply ignored, that is, dropped. In other cases, some software mechanism (such as the body of code 315) is included to implement a delivery policy of shortening the period between timer interrupts. By way of example only, it is assumed here that such an existing catch-up mechanism is included; the invention works just as well where the policy is to drop accumulated interrupts.

Upon the occurrence of some triggering event, the virtualization layer overrides the existing catch-up policy, for example, it disengages the traditional catch-up mechanism, and instead relies on the sponge process according to the invention to keep time accurate. (Note that there is typically a separate timer interrupt for each VCPU.) One example of a triggering event, in a para-virtualized system, could be that the guest issues an explicit "hypercall" to engage the timer sponge mechanism. Another example of a possible triggering event could be the presence of one or more predetermined commands in the register REG0 (the procedure will be the same for other VCPUs). For example, a Start command could be issued to engage the timer sponge mechanism according to the invention. In one implementation of the invention, the triggering event was the presence of any of the commands described immediately below except for the Quit command.

In one implementation of the invention, the set of commands used by the drivers to communicate with the virtualization layer was as follows. (Assume that VM 200-0 is interacting with the virtualization layer 300—the interaction of other VMs will be analogous.)

Query: Upon sensing that the driver has issued this command, the virtualization layer returns to the guest VM 200-0 that issued it a bit mask identifying the virtual CPU(s) eligible to service the next late timer interrupt. If there are no late timer interrupts, then the value, that is, response, that the virtualization layer returns to the guest (via the I/O port 230-0) is zero (or some other predetermined value indicating this condition). No change is then made in the delivery of timer interrupts.

Consume: If there is at least one late timer interrupt, then the next scheduled timer interrupt is delivered before the next guest instruction executes; this will in general be the instruction after the access to the I/O port. The response is a bit mask identifying the virtual CPUs eligible to service the timer interrupt after the one which is immediately delivered, assuming it is also late. If that timer interrupt is not currently late, or if there are no other timer interrupts currently scheduled, the return value is zero.

Reset: The virtualization layer 300 records that time is on schedule, dropping any backlog of timer interrupts that may have accumulated. The virtualization layer 300 then also overrides the existing policy for delivering interrupts, such as by disengaging the conventional catch-up mechanism. This Reset command can be implemented without requiring any defined return value.

Behind: The return value of this command is the number of time units (such as milliseconds) the guest is currently behind real time. The command has no other effect.

Quit: The virtualization layer engages the traditional catch-up mechanism 315 of shortening the period between timer interrupts. This Quit command can also be implemented without requiring any defined return value.

When the driver 810-0 is loaded at initialization time, it issues the Reset command. This prevents a large number of backlogged timer interrupts from being delivered the first time the driver runs. This could occur due to the driver not running as the guest OS boots. As the first timer sponge command that is issued, this also causes the virtualization layer to disengage the traditional catch-up mechanism.

The driver 810-0 periodically polls for the presence of backlogged interrupts using the Query command. If there is a backlog of interrupts, it wakes up, that is, signals or otherwise invokes so as to cause to run, the sponge process on the appropriate virtual CPU. This process then issues the Consume command, which causes a timer interrupt to be delivered in the context of the sponge process. When the sponge process continues executing, it examines the return value of the Consume command to determine whether it should issue another Consume command or simply go to sleep. As another possible response, if the currently running timer sponge process observes through the Query command that there are backlogged interrupts for a different virtual CPU, it could also issue any predefined signal to cause the sponge process for that other CPU to wake up sooner, rather than waiting for it to reach some timeout-limit for scheduled polling.

Although not required by the invention, the timer sponge process associated with each virtual CPU is preferably given a high priority—the timer sponge process normally sleeps (idles) waiting to be signaled by the virtualization layer (for example, by an interrupt, as described below) or at a timeout (in the polling implementation, also described below). When the virtualization layer wants to deliver its backlog of deferred timer interrupts to a sponge process, having it be high-priority reduces the latency between the signal and having the process wake up so it can consume the interrupt. Also, since the timer interrupts are delivered while the sponge process is running, the guest OS will "charge" that process for consuming a tick's worth of CPU time. If several backlogged timer interrupts are delivered quickly to the sponge process (as desired), it will appear to the guest OS that the sponge process is consuming a huge amount of CPU time. The guest OS will typically then try to deschedule the sponge process to allow other processes to run. By making the timer sponge a "high-priority" process, the guest OS will let it keep running longer, and will reschedule it more promptly if it is descheduled.

Each sponge process normally sleeps, consuming no CPU time within the guest OS. When the virtualization layer resumes execution of a virtual CPU for the VM that has been descheduled, it arranges to have the corresponding sponge process execute within the guest, and then delivers its backlog of pending timer interrupts at an accelerated rate while the sponge process is running. This ensures that the guest OS catches up with real-time, since all timer interrupts are delivered. It also ensures accurate per-process CPU accounting within the guest OS, since only sponge processes are charged for time when the VM was descheduled or delayed.

The virtualization layer can coordinate with the sponge processes by using an explicit signal, such as delivering a special virtual interrupt, for which the sponge process is waiting. Alternatively, the sponge processes can periodically poll the virtualization layer. Sufficient spacing between the delivery of catch-up timer interrupts is ensured by delivering them only when the sponge process is known to be executing; the sponge process may also explicitly notify the virtualization layer when it is safe to deliver each catch-up timer interrupt.

Using Guest Idle Process as Sponge

In the discussion above, it is assumed that whenever a processor is not actively performing some other task, it generally executes an idle loop. In some contexts, it may be beneficial to attribute some or all of the timer sponge overhead to the guest idle loop. This is related to the use of multiple sponge processes for more precise attribution of time, as described below. Instead of using an additional, specially designed "VM idle" process, timer interrupts could be delivered directly to the existing guest OS idle process.

Production servers generally employ software monitoring agents such as Simple Network Management Protocol (SNMP) agents to alert management software about CPU utilization and load spikes. It is not uncommon to have SNMP alerts generated when CPU utilization rises above 70-80%. The goal of such alerts is to tolerate additional usage spikes without sacrificing quality of service. Alerts are tracked, correlated and trended by mid-level management and analysis software to address immediate CPU utilization problems and perform long-term capacity planning.

In server consolidation scenarios, it is desirable to accommodate such requirements while reusing all idle host CPU time (including the last 20-30%) to run other VMs. It is also desirable to convert physical servers to VMs via any known physical-to-virtual (P2V) process without reconfiguring SNMP agents and keeping identical agent configuration across physical and virtual servers.

Now consider a scenario where guest software running in a high-priority VM processes time-critical requests coming in from a network. Such software often contains a self-monitoring feature that observes the percentage of idle time reported by the guest operating system and sheds load (for example, by redirecting incoming requests to another virtual machine) if the percentage is too low. Also suppose that this high-priority VM is running on the same host as several other VMs that are performing non-time-critical functions and have lower priority. If the high-priority VM uses the timer sponge driver of this invention, it will see the time used by lower priority VMs as being consumed by the timer sponge process (as opposed to the idle loop), conclude that the VM is heavily loaded, and begin to shed load. This behavior is undesirable because low-priority VMs are using CPU time only opportunistically—if the high-priority VM were to try to process more requests, the CPU time would be given to it instead.

To reduce the possibility of this behavior by a high-priority VM, the timer control module 310 could direct some late timer interrupts into the idle loop of the high-priority VM, that is, issue them when that idle loop is running, instead of into the timer sponge process, making the high-priority VM appear not to be fully loaded. Since this VM has high priority, it generally will be descheduled only when it in fact is idle, not because some other VM of higher priority took precedence over it. Therefore when the VM runs again after having been descheduled, it will usually be in its idle loop, and so the first late interrupt can feasibly be delivered to this idle loop rather than the timer sponge process. Conversely, if the VM is in fact using all available CPU time on the host hardware, it either will not be descheduled or will be descheduled when not idle, but in this case timer interrupts should not be delivered into the idle loop, since the VM really is heavily loaded.

Extension: Explicit Accuracy vs. Overhead Tradeoffs

The catch-up approach used by some existing virtualized computer systems will "give up" if it is unable to deliver enough backlogged timer interrupts to allow the guest OS to catch up to real time. For example, on a heavily overcommitted host, a VM may not be scheduled frequently enough to allow the catch-up approach to succeed even at its maximum catch-up delivery rate. In other words, given the limits to how much faster than real time the catch-up activity can run, on a heavily overcommitted host, a VM may not receive enough CPU time to allow it to catch up and keep up with real time. When the number of pending catch-up interrupts exceeds some threshold, they may therefore simply be dropped. As a result, the guest OS receives fewer timer interrupts than it should. While this causes timer inaccuracy, it also has the beneficial side-effect of reducing overhead, since the guest OS handles fewer interrupts.

While the basic timer sponge approach described above ensures that the guest OS will receive all of its timer interrupts, this will result in more overhead than the existing catch-up/give-up approach. In some cases it may be desirable to control or limit the amount of overhead expended while maintaining complete accuracy. For example, a VM configuration option might specify that no more than X % of the CPU time allocated to a guest by the host should be consumed processing timer interrupts.

Alternative Implementation: Interrupt-Based Sponge Wakeup

In the description of the prototype implementation presented above, sponge processes periodically poll the virtualization layer 300 to check for pending catch-up interrupts. An alternative implementation approach is to instead have the virtualization layer signal sponge processes explicitly.

For example, one alternative implementation can rely on a fictitious "timer sponge device" that generates a virtual interrupt on the virtual CPU that needs catch-up timer interrupts. The guest interrupt handler for the sponge device wakes up a sponge process on the current virtual CPU. The subsequent steps are the same as in the polling implementation, but without the overhead of periodic polling.

Extension: Reducing Overhead Associated with Idle VMs

Idle VMs may impose a non-trivial load on the host due to the need for periodic processing of timer interrupts. The overhead is due to i) VM scheduling cost; ii) establishing in the cache a footprint for each guest timer interrupt handler, and iii) executing the timer interrupt handler. The first two components of the overhead can be reduced using the timer sponge mechanism according to the invention.

VMs that can be classified as "very idle" can be penalized by being scheduled less frequently than busy VMs. While descheduled, they accumulate a backlog of catch-up timer interrupts. When an idle VM is finally scheduled, a series of accumulated timer interrupts is injected into the idle loop during a single VM scheduling quantum. This reduces the total number of idle VM context switches and leads to the execution of multiple guest timer interrupt handlers using a warm cache. Guest process accounting is not affected by this technique.

Figure 3:
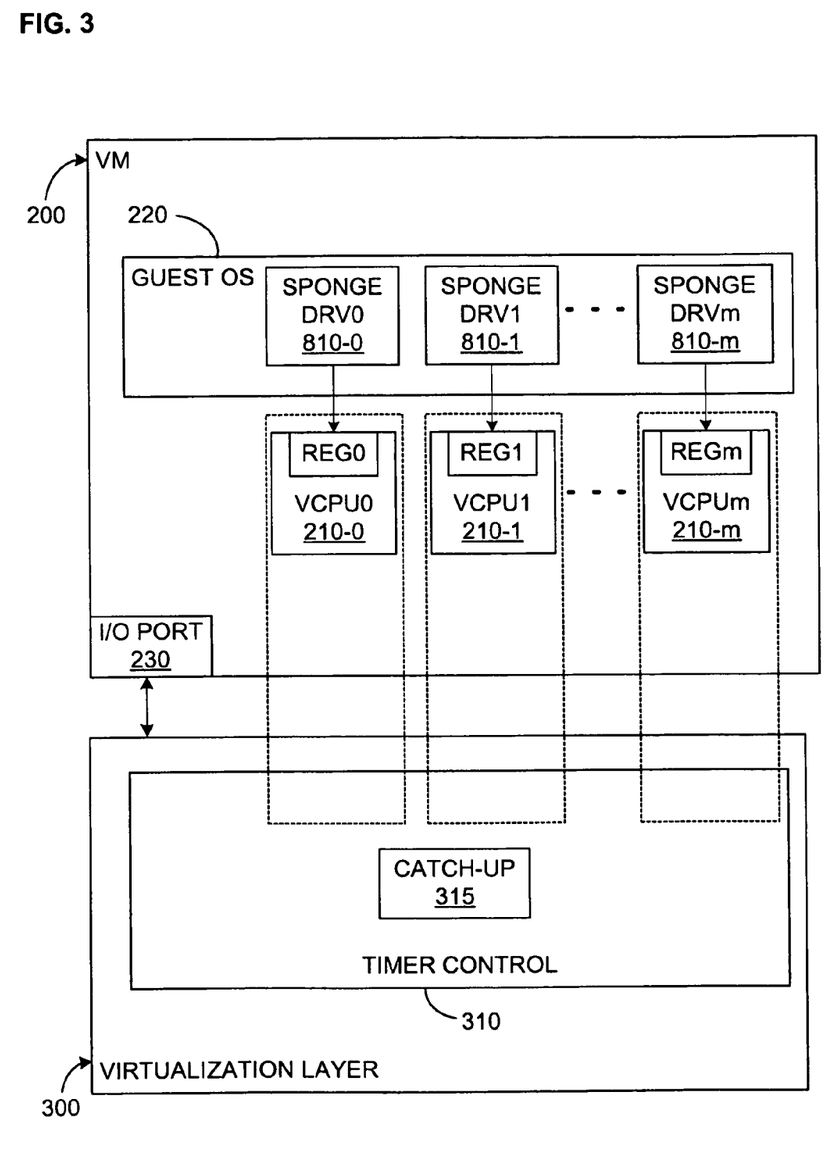
FIG. 3 illustrates an embodiment of the invention in which a separate timer sponge mechanism is included for each virtual CPU in an SMP virtual machine.

For SMP VMs, a separate sponge process is preferably associated with each virtual CPU (VCPU), as illustrated in FIG. 3. In FIG. 3, dashed rectangles are also shown extending around each virtual CPU and down into the virtualization layer; this is to illustrate the point made above that the software module here called a virtual CPU may in fact be some form of emulation exposed to the VM (in particular, the guest OS) by the virtualization layer.

Multi-Sponge Embodiment

As an optional extension, each per-VCPU sponge process can be split into a set of multiple, separate sponge processes in order to more precisely attribute time when the VM is delayed. For example, a sponge named "vmdesched" for time when the VM is descheduled due to CPU contention, a "vmself" sponge for time when the VM is delayed due to blocking I/O, device emulation, or other virtualization overhead, a "vmidle" sponge for time when the VM was descheduled due to guest OS idling/halting behavior, etc.

Implementation Media

The sponge drivers 810-0, . . . , 810-*m*, the timer control 310, and in fact the entire virtual machine 200 and virtualization layer 300 (such as the VMM) and virtualization software as a whole, will typically be implemented as one or more bodies of computer-executable code that are embodied in one or more computer-readable media such as in the memory 110 and/or on the disk 140, depending on memory capacity and the memory allocation decisions of the host OS or other system-level software such as the kernel 600. The VMs, including the sponge drivers, can also be provided on some other storage medium such as a CD-ROM, or downloaded over a physical network, for loading into the host computer 700, either separate from or together with the virtualization software as a whole, or just those components not already installed on the computer to be used.

Alternative Communication Mechanisms

In the description of the preferred embodiment of the invention above, communication between the guest and the virtualization layer, in particular, the control module 310, takes place via I/O ports and registers. Other communication channels may be used instead. Examples include a memory region that is shared by the driver(s) and the virtualization layer; an explicit "hypercall" as in para-virtualized systems; and having the virtualization layer make an "upcall" into the guest.

Alternative Software Environments and Uses

The invention is described above primarily, by way of example, in terms of implementation in a virtualized computer system; this is the implementation of the invention that the inventors foresee as being the most common. As mentioned above (in the second paragraph of this Detailed Description section), use of the invention is not so limited. One example of an alternative implementation would be use of the timer sponge technique according to the invention in a runtime system running on top of a traditional OS (such as Windows)—the runtime system would in such case be analogous to the guest OS, and the traditional OS would be analogous to the virtualization layer. Another example would be use of the invention in a system that includes a pure emulator (that is, a software entity that emulates a complete computer but that does not permit direct execution of the emulator software at a most privileged level, usually directly on the hardware processor) running on top of a host OS

We claim:

1. A method for a computer system that has host hardware, at least one guest supervisory software entity, and a software platform that runs on the host hardware, in which:
    in a host reference frame, the host hardware generates primary host signals indicating completion of a host resource quantum;
    in a guest reference frame, the guest supervisory software entity senses receipt of guest signals indicating completion of guest resource quanta, the guest supervisory software entity allocating each guest resource quantum to one of a plurality of guest processes;
    wherein the receipt of the guest signals and allocation of the corresponding guest resource quanta may be unsynchronized with the generation of the corresponding host quanta such that a backlog of resource quantum is created;
    wherein the software platform implements a first policy for handling the resource quantum backlog;
    the method comprising:
    designating one or more guest processes as sponge processes;
    sensing, an occurrence of a backlog of resource quantum due to unprocessed timer interrupts in a guest while the guest is descheduled; and
    delivering, in response to the sensing of the backlog, a guest signal to the guest supervisory software entity while one of the sponge processes is executing in the guest so that at least one of the resource quantum of the backlog is allocated to one of the sponge processes;
    whereby backlogged resource quanta are not allocated to guest processes other than the sponge processes to avoid improperly charging a guest process with resource quanta that were not consumed by the guest process.

2. A method as in claim 1, in which the host and the guest resource quantum is a unit of processor time and the host and guest signals are timer interrupts.

3. A method as in claim 2, in which each of the at least one guest supervisory software entity is a guest operating system (OS) running in a respective virtual machine, further comprising associating at least one of the sponge processes with one virtualized resource.

4. A method as in claim 3, in which the virtualized resource is a virtual processor.

5. A method as in claim 4, further comprising:
    installing a driver in each guest OS; and
    for each virtual processor in the respective virtual machine, including the respective sponge process as part of the driver in that virtual machine.

6. A method as in claim 5, wherein delivering the guest signal further includes:
    from the driver, issuing a request via a communications channel; and
    sensing the request and returning a corresponding quantum control response to the driver indicating whether any timer interrupts are currently backlogged.

7. A method as in claim 6, in which the communications channel includes a virtual I/O port.

8. A method as in claim 6, in which the communications channel includes a memory region that is accessible by both the driver and a control module.

9. A method as in claim 6, further comprising delivering, in response to a further request issued by the sponge process in the driver associated with the virtual processor that is currently running, a next scheduled backlogged timer interrupt to that sponge process.

10. A method as in claim 9, further comprising continuing to deliver, in response to further requests issued by the sponge process, additional backlogged timer interrupts to the currently running and requesting sponge process as long as there are backlogged timer interrupts.

11. A method as in claim 10, in which the guest OS is configured to deschedule processes as a function of at least their consumption of processor time and of a priority of each process, further comprising
    assigning a high priority to each sponge process, whereby the likelihood of descheduling the sponge process is reduced even if relatively many timer interrupts are delivered in a relatively short interval.

12. A method as in claim 10, further comprising maintaining each sponge process in an inactive state, activating each respective sponge process to receive timer interrupts, and returning activated sponge processes to the inactive state after any timer interrupts delivered while the sponge process was executing have been fully processed.

13. A method as in claim 9, further comprising activating a second, currently inactive sponge process by a first, currently active sponge process when the first sponge process senses that at least one additional backlogged timer interrupt is available, whereby the additional backlogged timer interrupt is delivered to the second sponge process.

14. A method as in claim 4, in which:
    the virtual processors execute idle loops when not performing any other task; and
    for each virtual processor, the idle loops are executed by the sponge process associated with the idling virtual processor.

15. A method as in claim 3, wherein sensing the occurrence of the backlog further includes:
    detecting a presence of a request written by the guest operating system in a register in the virtual machine.

16. A method as in claim 3, in which delivering the guest signal further includes writing responses to a respective memory region readable by the virtual machine.

17. A method as in claim 3, in which sensing the occurrence of the backlog further includes:
    sending a hypercall from the guest OS to a control module.

18. A method as in claim 3, in which in which sensing the occurrence of the backlog further includes:
    sending an explicit signal to the guest OS independent of any request by the guest OS.

19. A method as in claim 18, further comprising:
exposing to the virtual machine a virtual timer sponge device; and
activating the sponge process for a designated, currently inactive virtual processor by generating a virtual interrupt by the virtual timer sponge device on the currently inactive virtual process.

20. A method as in claim 3, further comprising associating a plurality of sponge processes with at least one of the virtual processors, each of the plurality of sponge processes being charged assumed resource quanta only when the corresponding virtual machine is not active because of a respective condition.

21. A method as in claim 1, in which the first policy is that the software platform delivers the guest signals to the guest supervisory software entity at a catch-up rate that lags the generation of the host signals by the host hardware.

22. A system for resource scheduling in a computer comprising:
host hardware that generates host signals indicating completion of a host resource quantum in a host reference frame;
a software platform that runs on the host hardware;
at least one guest supervisory software entity that, in a guest reference frame, senses receipt of guest signals indicating completion of guest resource quanta, which the guest supervisory software entity associates with a plurality of guest processes, such that receipt of the guest signals and association of the corresponding guest resource quanta may be unsynchronized with the generation of the corresponding host quanta such that a resource quantum backlog is created;
the software platform implementing a first policy for handling the resource quantum backlog;
a virtualization layer comprising a computer program product having computer-executable instructions embodied in a tangible medium:
for designating one or more guest processes as sponge processes;
sensing, an occurrence of a backlog of resource quantum; and
delivering, in response to the sensing of the backlog, a guest signal to the guest supervisory software entity while one of the sponge processes is executing in the guest so that at least one of the resource quantum of the backlog is allocated to one of the sponge processes;
whereby backlogged resource quanta are not allocated to guest processes other than the sponge processes to avoid improperly charging a guest process with resource quanta that were not consumed by the guest process.

23. A system as in claim 22, in which the resource quantum is a unit of processor time and the host and guest signals are timer interrupts.

24. A system as in claim 23, in which each of the at least one guest supervisory software entity is a guest operating system (OS) running in a respective virtual machine, in which each sponge process is associated with at least one virtualized resource.

25. A system as in claim 24, in which the virtualized resource is a virtual processor.

26. A system as in claim 25, further comprising a driver installed in each guest OS, the respective sponge process being included as part of the driver in that virtual machine for each virtual processor in the respective virtual machine.

27. A system as in claim 26, further including:
a control module embodied within the virtualization layer; and
a communications channel;
the virtualization layer being further provided for communicating the quantum control responses to each guest as, from the driver, by issuing a request via the communications channel;
the control module sensing the request and returning a corresponding quantum control response to the driver indicating whether any timer interrupts are currently backlogged.

28. A system as in claim 27, in which the communications channel includes a virtual I/O port.

29. A system as in claim 27, in which the communications channel includes a memory region that is accessible by both the driver and the control module.

30. A system as in claim 27, in which sensing further includes a triggering event for a hypercall from the guest as to the control module.

31. A system as in claim 24, in which sensing further includes a triggering event for the presence of a request written by the guest operating system in a register in the virtual machine.

32. A system as in claim 24, in which:
the virtual processors execute idle loops when not performing any other task; and
for each virtual processor, the idle loops are executed by the sponge process associated with the idling virtual processor.

33. A system as in claim 24, in which sensing further includes a triggering event for an explicit signal to the guest as independent of any request by the guest OS.

34. A system as in claim 22, in which the software platform comprises a hypervisor.

35. A method for a computer system that has host hardware and at least one guest supervisory software entity, and a software platform that runs on the host hardware, in
which in a host reference frame, the host hardware generates host signals indicating completion of a host resource quantum;
in a guest reference frame, the guest supervisory software entity senses receipt of guest signals indicating completion of guest resource quanta, which the guest supervisory software entity associates with a plurality guest processes;
the receipt of guest signals and association of the corresponding guest resource quanta may be unsynchronized with the generation of the corresponding host quanta such that a backlog of resource quantum is created;
wherein the software platform implements a first policy for handling the resource quantum backlog; and
the quest supervisory software entity is a quest OS, the resource quantum is a unit of processor time, and the host and guest signals are timer interrupts;
the method comprising:
designating one or more guest processes as sponge processes;
installing a driver in each guest OS;
for each virtual processor in a respective guest reference frame, including the respective sponge process as part of the driver in that guest OS;
sensing an occurrence of a backlog of resource quantum; and
delivering, in response to the sensing of the backlog, a guest signal to the guest OS while one of the sponge processes is executing in the guest OS so that at least one of the resource quantum of the backlog is allocated to one of the sponge processes;

whereby backlogged resource quanta are not allocated to guest processes other than the sponge processes to avoid improperly charging a guest process with resource quanta that were not consumed by the guest process.

36. A method for tracking resources use in a virtual computer system, the method comprising:
   designating one or more guest processes as sponge processes, the guest processes executing in a guest computer being executed in a host computer system;
   detecting a backlog of completed resource quanta in the guest computer, each resource quantum being associated with consumption of a unit of the resource; and
   delivering whenever the backlog is detected a guest signal to the guest computer while one of the sponge processes is executing, the guest signal indicating consumption of resource quanta, the guest signal causing the backlog of resource quanta to be allocated to one of the sponge process;
   whereby the backlog of resource quanta is not allocated to guest processes other than sponge processes to avoid charging guest processes with consumption of the resource.

37. The method as in claim 36, wherein the backlog of resource quanta is caused by descheduling the guest computer for a period of time.

38. The method as in claim 36, wherein the guest computer allocates one unit of consumption of the resource to a guest process executing when the guest signal is received by the guest computer.

39. A computer program embedded in a non-transitory computer-readable storage medium, when executed by one or more processors, for tracking resources use in a virtual computer system, the computer program comprising:
   program instructions for designating one or more guest processes as sponge processes, the guest processes executing in a guest computer being executed in a host computer system;
   program instructions for detecting a backlog of completed resource quanta in the guest computer, each resource quantum being associated with consumption of a unit of the resource; and
   program instructions for delivering whenever the backlog is detected a guest signal to the guest computer while one of the sponge processes is executing, the guest signal indicating consumption of resource quanta, the guest signal causing the backlog of resource quanta to be allocated to one of the sponge process;
   whereby the backlog of resource quanta is not allocated to guest processes other than sponge processes to avoid charging guest processes with consumption of the resource.

40. The computer program as in claim 39, wherein the backlog of resource quanta is caused by unprocessed timer interrupts accumulated in the guest computer while the guest computer is descheduled.

* * * * *